June 3, 1930.  E. A. GLYNN  1,760,944
TIRE RETREADING MOLD
Filed Dec. 15, 1928   2 Sheets-Sheet 1

INVENTOR
E. A. Glynn
BY
ATTORNEY

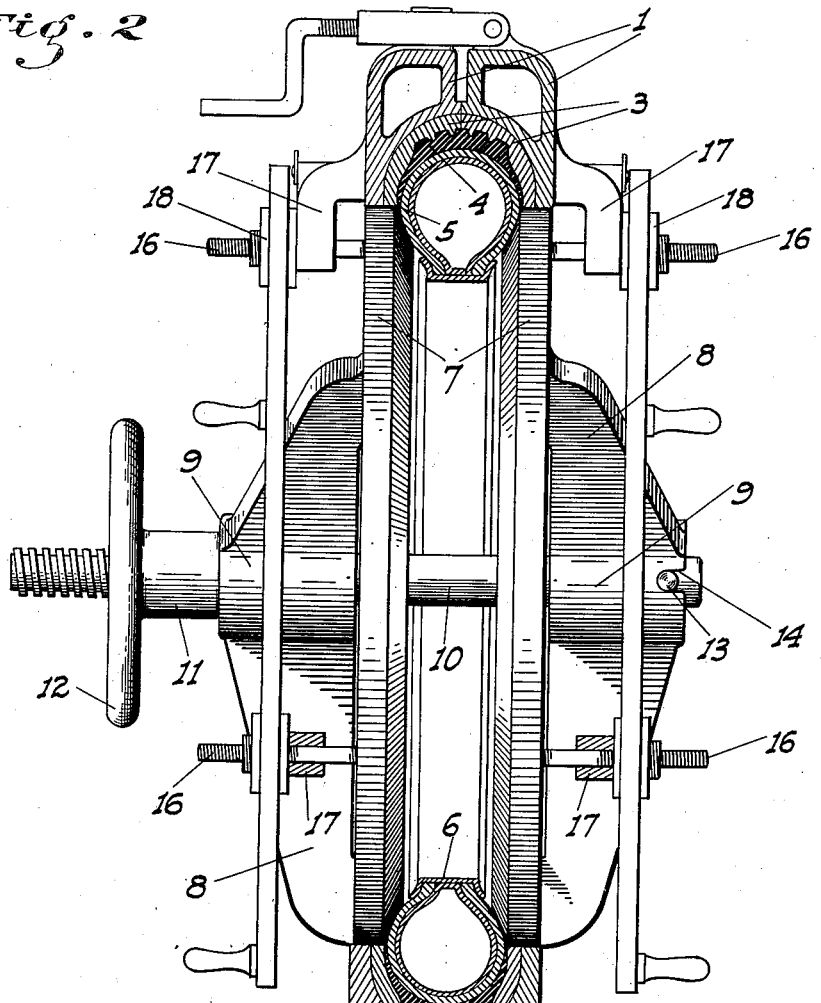
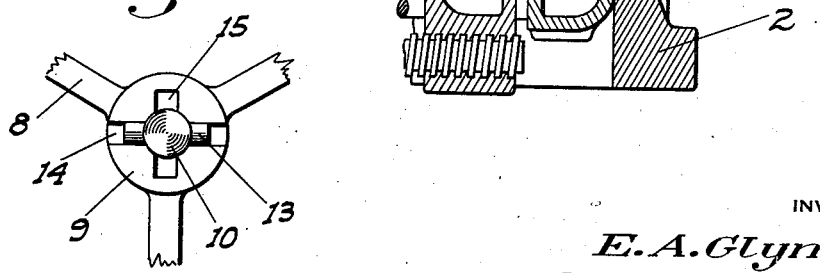

Patented June 3, 1930

1,760,944

UNITED STATES PATENT OFFICE

EDWIN A. GLYNN, OF LODI, CALIFORNIA, ASSIGNOR TO THE SUPER MOULD CO., OF LODI, CALIFORNIA, A CORPORATION

TIRE-RETREADING MOLD

Application filed December 15, 1928. Serial No. 326,322.

This invention relates to molds for retreading automobile tires, of that general continuous-circle character shown in Patent No. 1,662,035, dated Mar. 6, 1928 to Messrs. Smith, Caufield, and Peterson; and in which annular rings were mounted for axial movement relative to the mold against the opposite sides of the tire to cause the tread portion thereof to be firmly engaged with the matrix portion of the mold. The present invention relates particularly to the means for actuating these rings.

In the structure of the previous patent, as well as in that of their later Patent No. 1,710,804 dated April 30, 1929, the rings were moved inwardly against the tire by a number of independently actuated elements. This was unobjectionable and unsatisfactory in that it took considerable time to manipulate all these different elements and it was hard to insure that the inward movement of the rings would be the same at all points engaged by the actuating elements, and which equal movement is of course necessary to prevent the rings from becoming moved askew or out of parallel with each other.

The principal aim of this invention therefore is to provide an actuating means for the rings so connected thereto that the rotation of a single member causes both rings to be moved simultaneously and without the possibility of the rings moving out of parallel alinement with each other at any time, thus lessening the time needed to operate the structure and insuring more accurate results.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Fig. 2 is a similar view showing the rings advanced against the tire.

Fig. 3 is an end view of one of the ring-spider hubs.

Figure 1:
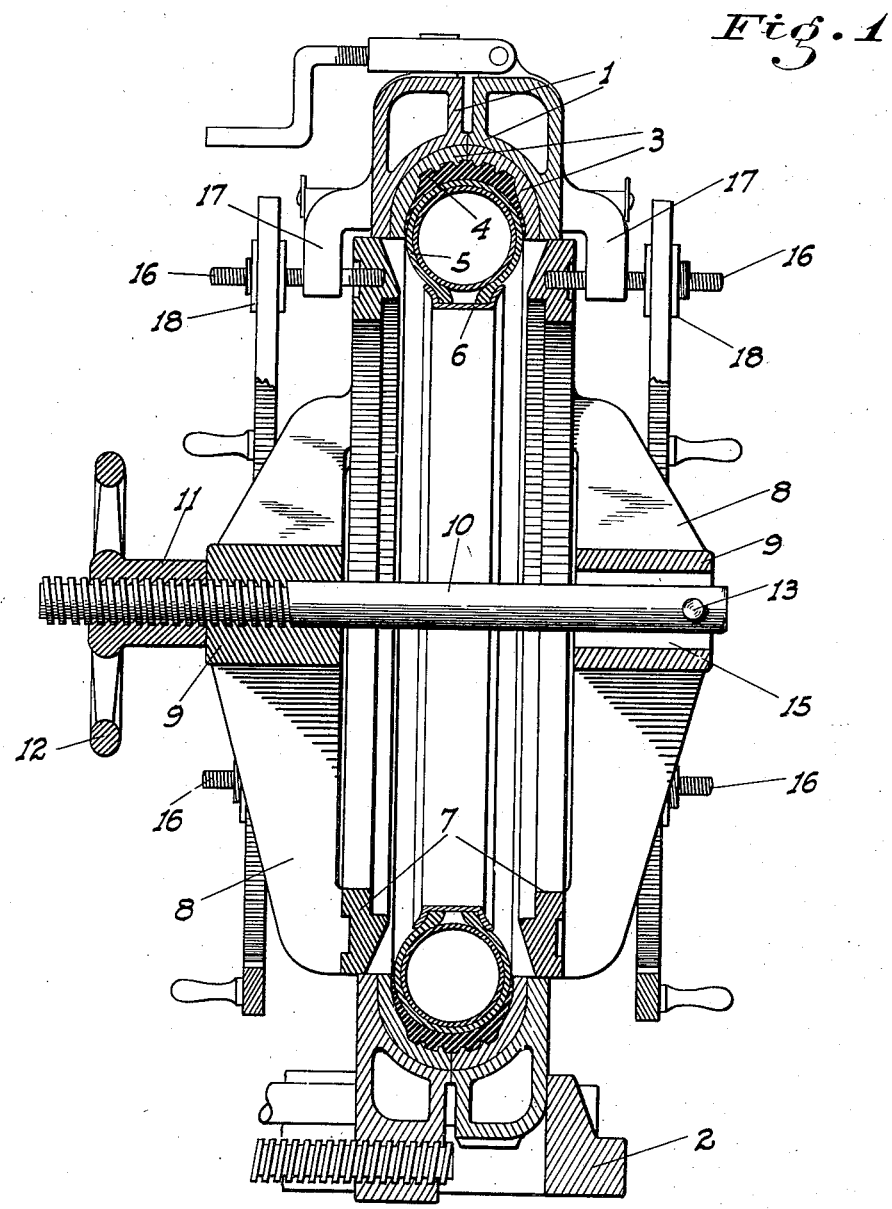
Fig. 1 is a vertical cross section of the mold structure showing the tire engaging rings in their retracted position.

Referring now more particularly to the characters of reference on the drawings, the numeral 1 denotes a pair of separable annular mold sections supported in a vertical position on a frame 2, movable to and from each other and clamped against movement when brought together by suitable means such as is fully shown and described in the above mentioned co-pending application, and forming no part of this invention.

Annular matrix sections 3 having the design of the tread portion 4 of a tire 5 formed therein are removably mounted in the mold sections, said matrix and mold sections extending inwardly to a point adjacent the central sectional plane of the tire, or to the base of the tread portion thereof.

The tire when placed in the mold is mounted on an ordinary rim 6 and the sides of the tire then project inwardly of the mold.

Slidably fitting the inner periphery of the mold sections and matrices are opposed rigid rings 7, adapted on their inner faces to engage the sides of the tire between the tread and the rim engaging portion thereof. The rings are each formed with rigid spider arms 8 converging to a central hub 9 concentric with the ring; a shaft 10 projecting through the hubs of both spiders. One end of the shaft is threaded and is engaged by the hub 11 of a hand wheel 12, the other end of the shaft having a cross-pin 13 to removably engage a socket 14 cut in the hub of the opposed ring spider to prevent turning of the shaft. By reason of this arrangement it will be seen that if the hand wheel is advanced along the shaft with the hub thereof engaging the adjacent spider hub, the rings will be brought together simultaneously. Since the pressure is exerted at the center of the ring circle, the rings will move the same distance at all points of their periphery, and the possibility of the rings getting out of parallel with each other is avoided.

It is necessary to withdraw the shaft from between the rings when removing or placing a tire in the mold, as will be evident. This may be done by removing the hand wheel from the shaft so as to pull the shaft through the hubs from the opposite end, by having the cross pin 13 removable from the shaft; or as shown herein by providing longitudinal slots 15 through the socketed spider hub so as to enable the pin 13 to pass clear of the hub after the shaft has been first advanced so as to clear the pin from the socket 14 and has been then turned to aline the pin with the slots.

The rings are floatably mounted with respect to the mold by means of rigid studs 16 projecting outwardly from the rings, which are slidably supported by rigid lugs 18 mounted on the mold sections.

Adjustable stops 19 are preferably mounted on the studs outwardly of the lugs for engagement therewith after the rings have been moved toward each other a certain amount. Such stops, and the means for adjusting the same however, form no part of this invention, being fully described and claimed in the co-pending application of H. J. Woock, Serial No. 317,515 filed November 6, 1928.

From the foregoing description it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention what I claim as new and useful and desire to secure by Letters Patent is:

1. A tire retreading mold including an annular mold structure to receive the tire to be retreaded, a pair of rigid opposed annular rings to project inwardly of the mold to engage the opposite sides of a tire engaged with the mold, and means applied to the rings from the axis thereof for moving said rings axially toward each other.

2. A tire retreading mold including an annular mold structure to receive the tire to be retreaded, a pair of rigid opposed annular rings to project inwardly of the mold to engage the opposite sides of a tire engaged with the mold, spiders formed with the rings and including hubs centered with the rings, and means applied to the hubs for moving the rings axially toward each other.

3. A tire retreading mold including an annular mold structure to receive the tire to be retreaded, a pair of rigid opposed annular rings to project inwardly of the mold to engage the opposite sides of a tire engaged with the mold, spiders formed with the rings and including hubs centered with the rings, a screw shaft slidably projecting through the hubs and non-turnably engaged with one of the same, and a turnable member threaded on the shaft outwardly of the opposite hub and adapted to engage the same.

4. A tire retreading mold including an annular mold structure to receive the tire to be retreaded, a pair of rigid opposed annular rings to project inwardly of the mold to engage the opposite sides of a tire engaged with the mold, spiders formed with the rings and including hubs centered with the rings, a screw shaft slidably projecting through the hubs, means non-turnably but detachably connecting said shaft to one of the hubs, and a handwheel having a hub threaded on the shaft outwardly of the other spider hub and adapted to engage the same.

In testimony whereof I affix my signature.
    EDWIN A. GLYNN.